(12) United States Patent
Bozionek et al.

(10) Patent No.: US 9,002,351 B2
(45) Date of Patent: Apr. 7, 2015

(54) METHOD FOR SWITCHING COMMUNICATION LINKS TO A MOBILE TERMINAL DEVICE WHICH IS ASSOCIATED WITH A LOCAL RADIO AREA OF A NETWORK

(71) Applicants: Bruno Bozionek, Borchen (DE); Thomas Hanna, Detmold (DE); Klaus-Josef Kunte, Borchen (DE)

(72) Inventors: Bruno Bozionek, Borchen (DE); Thomas Hanna, Detmold (DE); Klaus-Josef Kunte, Borchen (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/108,828

(22) Filed: Dec. 17, 2013

(65) Prior Publication Data

US 2014/0119338 A1 May 1, 2014

Related U.S. Application Data

(63) Continuation of application No. 13/062,598, filed as application No. PCT/EP2009/006767 on Sep. 18, 2009, now Pat. No. 8,649,787.

(30) Foreign Application Priority Data

Sep. 19, 2008 (DE) .......................... 10 2008 047 932

(51) Int. Cl.
*H04W 4/00* (2009.01)
*H04W 36/16* (2009.01)
(Continued)

(52) U.S. Cl.
CPC ................ *H04W 36/16* (2013.01); *H04W 4/16* (2013.01); *H04L 65/1073* (2013.01); *H04W 84/105* (2013.01); *H04L 67/24* (2013.01)

(58) Field of Classification Search
USPC ....................................... 455/432.1
See application file for complete search history.

(56) References Cited

U.S. PATENT DOCUMENTS 7,197,306 B1 3/2007 Song
7,965,690 B2 6/2011 Hancock et al.
(Continued)

FOREIGN PATENT DOCUMENTS

| WO | 0013449 A2 | 3/2000 |
| WO | 2007015068 A1 | 2/2007 |
| WO | 2007038799 A2 | 4/2007 |

OTHER PUBLICATIONS

International Search Report for PCT/EP2009/06767 dated Mar. 24, 2010 (German Translation).
(Continued)

*Primary Examiner* — Joel Ajayi
(74) *Attorney, Agent, or Firm* — Buchanan Ingersoll & Rooney PC

(57) ABSTRACT

A mobile terminal device determines whether it is located in the local radio area of the network or in another radio area and the determined radio area is indicated to an application of the network. The application is used to control a communication request addressed to the mobile terminal device. Communication requests coming in on the network can be directly switched to the local radio area using the application or can be directly forwarded to the mobile radio address in the mobile radio network of which the mobile terminal device is located, thereby avoiding or substantially reducing roaming or forwarding of communication requests from the local radio area to another radio area and thereby achieving an economical operation of mobile telephone terminal devices with local radio area.

20 Claims, 1 Drawing Sheet

(51) Int. Cl.
  *H04W 4/16* (2009.01)
  *H04L 29/06* (2006.01)
  *H04W 84/10* (2009.01)
  *H04L 29/08* (2006.01)

(56) References Cited

U.S. PATENT DOCUMENTS

2005/0130651 A1 6/2005 Creamer et al.
2005/0136926 A1 6/2005 Tammi et al.
2005/0159153 A1 7/2005 Mousseau et al.
2005/0286504 A1 12/2005 Kwon

OTHER PUBLICATIONS

International Search Report for PCT/EP2009/006767 dated Mar. 24, 2010 (English Translation).
Written Opinion of the International Searching Authority for PCT/EP2009/006767 dated Mar. 24, 2010 (German Translation).
3GPP Standard; 3GPP TR 43.902, 20070801 3rd Generation Partnership Project (3GPP), Mobile Competence Centre; 650, route des Lucioles; F-06921 Sophia-Antipolis Cedex; France, NR.V7.0.1,pp. 1-134, 3GPP TR 43.902.

METHOD FOR SWITCHING COMMUNICATION LINKS TO A MOBILE TERMINAL DEVICE WHICH IS ASSOCIATED WITH A LOCAL RADIO AREA OF A NETWORK

CROSS-REFERENCE TO RELATED APPLICATIONS

This application is a continuation application of U.S. patent application Ser. No. 13/062,598, which is the United States national phase under 35 U.S.C. §371 of PCT International Application No. PCT/EP2009/006767, filed on Sep. 18, 2009, that claims priority to German National Application No. 10 2008 047 932.2 filed Sep. 19, 2008.

BACKGROUND OF THE INVENTION

1. Field of the Invention

Embodiments of the invention relate to calculation or reduction of fees for roaming or forwarding of communications links.

2. Background of the Related Art

In mobile terminal device networks, especially telephone terminal devices, or in mobile wireless networks, it increasingly common for local areas to be defined in which cheaper rates or fees are offered by the network operators. The local area is usually identical to a local radio area, such that the local radio area corresponds to at least one radio zone of a wireless network. The lowest rate applies as long as the mobile telephone terminal device is located in that local radio network. Operators hope for greater use of mobile terminal devices through the offered local radio areas or local areas, especially mobile wireless terminal devices.

Low rates are often assigned to these local areas, especially for communication links within the local radio network and in fixed networks. Flat rates are then offered to mobile wireless terminal devices or their users, giving them unlimited telephone calling from and within the local area, generally to network addresses—which are usually the telephone numbers of fixed networks—in and from the fixed networks. The local area can be selected by the user of the mobile wireless terminal device, primarily a local radio area in their place of residence.

A local radio area is a transmitter or base station with a radio area assigned, over which the transmitter sends wireless signals in its radio area with its recognition signal or transmitter recognition signal. If a mobile wireless terminal device uses a transmitter with that recognition signal, then it is located in that local radio network. Because the radio areas of transmitters overlap, radio areas are not precisely defined, and therefore mobile wireless network operators guarantee a minimum size of the local radio area.

If a communication request is signaled from the fixed network to the mobile wireless terminal device with the network address of the fixed network, the signal is directed to its local radio area. However, if the mobile wireless terminal device is not located in the local radio area, then roaming is initiated and the signal is forwarded from the local radio network to the local area in the mobile wireless network where the mobile wireless terminal device is located at that time. This roaming or forwarding of a connection request from one local area to another local area, or the signaling related to it, leads to higher fees, which actually should be reduced by adjusting a local radio area.

BRIEF SUMMARY OF THE INVENTION

The basis for the invention consists of reducing the fees for roaming or forwarding of requested communication links to the local radio network of mobile terminal devices when the mobile terminal devices are not located in the local radio area.

The significant aspect of the method according to embodiments of the invention is that the mobile terminal device determines whether it is located in the local radio network or in another radio area, and the mobile terminal device indicates the determined radio area to an application on the network. By means of the application, a communication request addressed to the mobile terminal device through another network is either directed to its local radio area or forwarded to the other radio area, or the communication link is informed that the mobile terminal device is not located in the local radio area. The method according to the invention is especially well suited for mobile telephone terminal devices or mobile multimedia terminal devices and also for mobile terminal devices in fixed networks.

A significant advantage of embodiments of the invention is that, by means of the network application, incoming communication requests to the local area are directly established or directly forwarded, with the address of a wireless network, to the wireless network where the mobile terminal device is located. This eliminates or significantly reduces roaming or forwarding of communication attempts from the local radio area to another radio area, because using the network application, communication links with the network address of the other radio area are sent directly to the mobile terminal device, which is more efficient than roaming controlled by the operator.

According to one embodiment of the invention, a local radio area detected by the mobile terminal device or another mobile network signals or transmits to the network application, and preferably the network-specific terminal device protocol in networks with Internet protocol is represented by the standardized Session Initial Protocol (SIP), wherein the signaling is effected by a register request producing another contact parameter or a register request producing another parameter. This simple forwarding of the standardized SIP protocol allows the network application to be signaled or notified of the signaling of the residence location of the mobile terminal device.

The mobile terminal devices can also use a JAVA application, for example, to perform the functions according to the invention. In this case, mobile terminal devices can easily be retrofitted to work with the method according to the invention.

Additional preferential developments of the invented method and one communication arrangement according to the invention can be found in other claims.

The following text further explains the invention and its developments, with reference to two drawings.

DETAILED DESCRIPTION OF THE INVENTION

Figure 1:
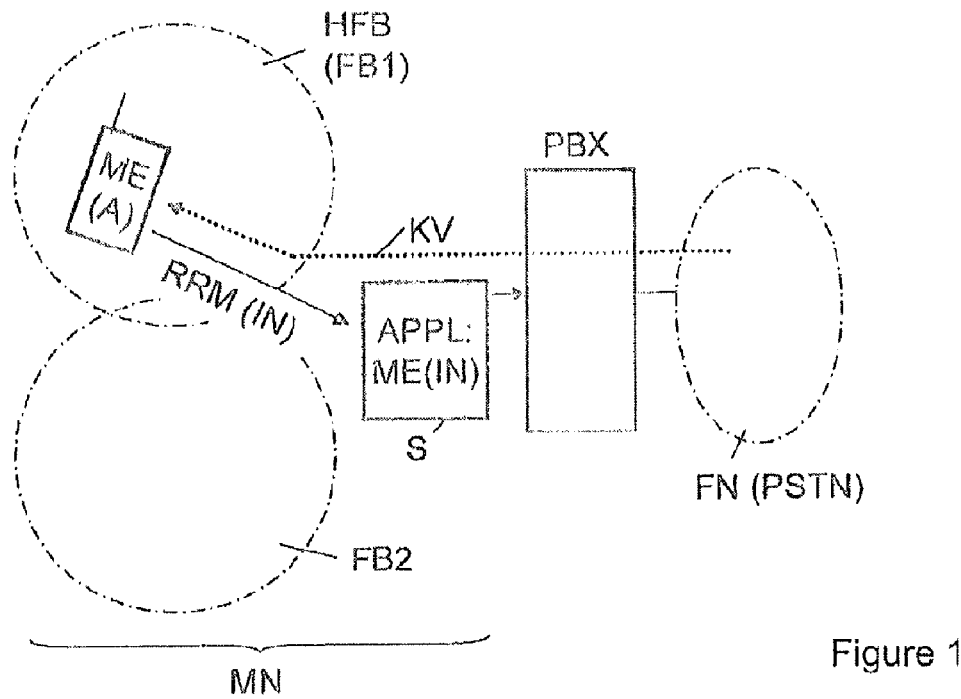
FIG. 1 a block diagram showing a communication arrangement for executing the method according to the invention, in which a mobile wireless terminal device is located within a local radio area, and FIG. 2 a communication arrangement as in FIG. 1, in which the mobile wireless terminal device is located outside of the local radio area.

FIG. 1 is a schematic diagram showing an example of a communication arrangement in which the invented method is used, including only components in which the invented method is implemented or which are necessary in order to clarify the invented method.

FIG. 1 shows an example for explaining the invention, consisting of two radio zones or radio areas FB1, FB2 in a mobile wireless network MN, wherein the mobile wireless network MN includes multiple radio zones. The radio areas FB1, FB2 here are determined by the radio range of the base stations or their transmitters in each mobile wireless network MN or other wireless network. The mobile wireless network MN can be arranged according to a GSM or UMTS standard, for example.

For this example it is assumed that one of the two radio areas FB1, FB2 is assigned as the local radio area HFB—designated in FIG. 1 as HFB(FB1)—for the mobile terminal device ME. Local radio areas HFB are increasingly offered by operators of mobile wireless networks MN, wherein lower rates apply for a mobile terminal device ME in its local radio area HFB than in the rest of the mobile wireless network MN. Lower rates also apply for connections to and from the fixed network, especially the fixed telephone network. These lower rates apply as long as the mobile terminal device ME is located in this local radio area HFB. If a mobile terminal device ME moves from the local radio area HFB to another radio area FB, then it is recognized by the respective base stations in the mobile wireless network MN and switched to the standard rates or fees for the mobile wireless network MN.

In this case, the local radio area HFB can assign a different address or telephone number for the address or telephone number in the mobile wireless network MN. As an example, this can be the address or telephone number assigned to a subscriber on the mobile wireless network MN in the fixed network FN, if he is also subscribed to the fixed network FN.

FIG. 1 also shows a server S in which an application APPL is run, wherein the server S is connected to a communication system KS that is used, for example, by a company for handling fixed network connections and company-specific wireless connections. The communication system KS can manage connections to and from a fixed network FN, such as a fixed telephone network PST, for example. The server S can also be functionally integrated into the communication system KS as an application server or can be a functional component of the communication system KS such that the server S can be reached through the mobile wireless network MN.

The server S can be part of the mobile wireless network MN and can be reached by each of the mobile terminal devices ME at least through its service data channel or a data channel of the mobile wireless network MN. If the mobile terminal device ME is subscribed to a GPS mobile wireless network GSM, an SIP protocol (Session Initial Protocol) with a data or service channel is preferably used as the signaling channel, by means of which the mobile terminal device ME notifies the server S or the application APPL of whether it is located in the local radio area HFB or in another radio area FB2. If the mobile terminal device ME is subscribed to the UMTS mobile wireless network UMTS, the SIP protocol is also used as the signaling protocol and can be used directly for reporting on the home area of the mobile terminal device ME.

The home area of the mobile terminal device ME is determined by an application A in the mobile terminal device ME. In this case, the respective radio area FB2 assigned as the local radio area HFB for the mobile terminal device ME is entered into the application A. For example, the local radio area HFB is provided by means of a recognition signal through the base station or even multiple base stations—not shown—that provide wireless coverage for the local radio area HFB. By comparing the currently received recognition signal from the base station(s) with the information assigned to the application A via the base station(s) of the local radio area HFB, it is possible to determine whether the mobile terminal device ME is located in its local radio area HFB.

According to the invention, an extension of the standardized SIP protocol SIP—in particular, RFC standard 3261—is to be used to report the home area of the mobile terminal device ME.

According to a first exemplary variation, the information that shows where the mobile terminal device ME is located in the local radio area HFB or in another radio area FB is transmitted to the server S by means of an additional piece of information in the "contact" parameter contained in the Register Request Message.

The Register Request Message (RRM) is structured as follows:
REGISTER sips: ss2.biloxi.example.com SIP/2.0
Via:SIP/2.0/TLS client.biloxi.example.com:5061;
branch=z9hG4bKnashds
Max-Forward: 70
From: Bob <sips:bob@biloxi.example>;tag=a73kszlfl
To: Bob <sips:bob@biloxi.example.com>
Call-ID: 1j9FpLxk3uxtm8tn@biloxi.example.com
CSeq: 1 REGISTERED MAIL
Contact: "Mr.Bob"
<sips:bob@client.biloxi.example.com>; q=0, 7;
Expires=3600; homezone=[IN,OUT]
Content-Length: 0

As an alternative, for example, the Register Request Message (RRM) itself can be expanded as follows:
REGISTER sips: ss2.biloxi.example.com SIP/2.0
Via:SIP/2.0/TLS           client.biloxi.example.com:5061;
branch=z9hG4bKnashds
Max-Forward: 70
From: Bob <sips:bob@biloxi.example>;tag=a73kszlfl
To: Bob <sips:bob@biloxi.example.com>
Call-ID: 1j9FpLxk3uxtm8tn@biloxi.example.com
CSeq: 1 REGISTERED MAIL
Contact: "Mr.Bob"
<sips:bob@client.biloxi.example.com>;q=0,7;
Expires=3600;
homezone=[IN,OUT]
Content-Length: 0

Using the Register Request Message RRM, the mobile terminal device ME reports whether it is located in its local radio area HFB or is outside of its local radio area HFB in another radio area FB of the mobile wireless network MN.

For this example, it is assumed that the mobile terminal device ME is first located in its local radio area HFB. According to the invention, a Register Request Message RRM is generated and sent wirelessly through the mobile wireless network MN to the server S, wherein the Register Request Message RRM shows, by means of a piece of information IN, that it is located in its local radio area HFB, designated in FIG. 1 by an arrow marked with RRM(IN). In the server S, the information IN is stored in an application APPL and made available to the communication system KS. The information IN is displayed by the communication system KS with a status indication within a Presence Service, i.e., using this information IN, mobile terminal devices ME located in the local radio area HFB can be incorporated into a service for preferred terminal devices ME, which is done in the communication system KS (not shown).

Communication requests KV addressed to the mobile terminal device ME are forwarded directly with the address or telephone number of the local radio area HFB. This means that establishment of the connection or session is directed or transmitted through the server S and the communication system KS, so therefore in the network with the address or telephone number of the local radio area HFB, directly to the mobile terminal device ME, shown in FIG. 1 by dotted lines marked KV.

Figure 2:
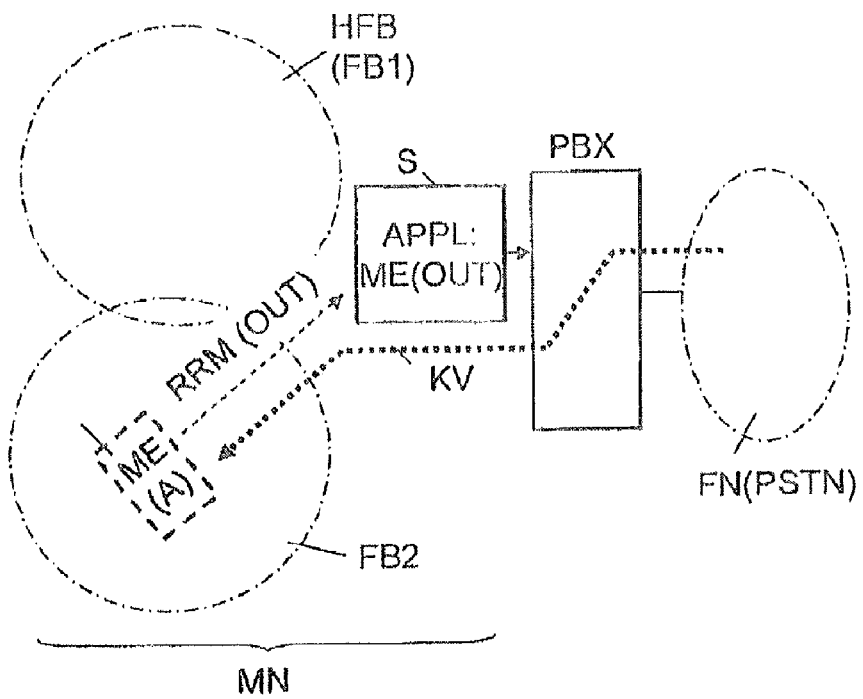

For this example, it is assumed that the mobile terminal device ME—shown as a shaded rectangle—is moved from the local radio area HFB to another radio area FB2, such as when the user of the mobile terminal device ME moves to another location (see FIG. 2). After leaving the local radio area HFB, this is recognized by the application A in the mobile terminal device ME, and a Register Request Message RRM is generated and sent wirelessly via the mobile wireless network MN to the server S, wherein the Register Request Message RRM shows, by means of the information OUT, that it is not located in its local radio area HFB—shown in FIG. 1 has an arrow marked RRM (OUT). In the server S, the information OUT is stored in the application APPL and made available to the communication system KS. In this case, the information OUT from the communication system KS is displayed with a status indication within a presence service (not shown).

Communication requests KV addressed to the mobile terminal device ME are now no longer forwarded directly to the address or telephone number of the local radio area HFB. According to the invention, multiple variations are possible for handling the communication request KV or the initiated establishment of a connection.

One possibility consists of using an announcement device to inform the calling terminal device ME, as part of establishing a connection or a session that the mobile terminal device ME is not located in its local radio area HFB. In addition, the communication request or calling terminal device can be notified of the address or telephone number of the mobile wireless network MN in which the mobile terminal device ME is located.

In a further possibility, the communication request or initiated establishment of a connection or session with the address or telephone number of the mobile terminal device ME in the mobile wireless network MN is directed to the mobile terminal device ME, shown in FIG. 2 as dotted lines marked KV. In this way, roaming or forwarding of the communication request KV from one radio area FB to another radio area FB in the mobile wireless network MN can be avoided. Furthermore, by using internal company addresses or telephone numbers on the mobile wireless network MN, lower rates for forwarding the established connection to a mobile terminal device ME MN can be achieved.

It is also possible to retrofit mobile terminal devices ME that are already in use. For example, by means of an application A written in the object-oriented programming language JAVA in the mobile terminal device ME, the functions according to the invention, such as reporting the home location in the local radio area HFB and notifying the server S using a Register Request Message RRM, can be performed.

For example, a suitable data or service channel can also be established using GRPS or SMS, depending on the terminal device's performance capabilities. In this way, the invention's use is not limited to particular terminal devices such as mobile telephones, but rather can also be applied to configurations with wireless terminal devices or fixed network terminal devices in which a local area can be defined, and different handling of communication requests is possible depending upon the terminal device's location inside or outside of the local area.

What is claimed is:

1. A method for switching communication links to a mobile terminal device that is allocated to a local radio area network, the mobile terminal device having a first address for communications when in a first local radio area of the local radio area network, the method comprising:

a first mobile terminal device determining whether the mobile terminal device is in the first local radio area to which the first mobile terminal device is allocated or in another radio area that is not within the first local radio area;

the first mobile terminal device signaling to an application of the network the determined radio area of the first mobile terminal device, the signaling of the determined radio area by the first mobile terminal device being effected by the first mobile terminal device sending a message to an application of the network, the message being one of:

(i) a Register Request Message containing a parameter indicating that the first mobile terminal device is located in a second radio area, the parameter comprising a second address of the mobile communication device, and (ii) a Register Request Message containing a parameter indicating that the first mobile terminal device is not located in the first local radio area;

via the application of the network, controlling directly on the first local radio area of the network a communication request addressed by another network to the first mobile terminal device when the first mobile terminal device is determined to be in the first local radio area; and when the first mobile terminal device is not in the first local radio area of the network, performing one of:

forwarding the communication request addressed by the other network to the first mobile terminal device via the application of the network directly with an address of the determined radio area of the first mobile terminal device, forwarding the communication request addressed by the other network to the first mobile terminal device via the application of the network directly to the determined radio area of the first mobile terminal device, and informing the other network that addressed the communication request that the first mobile terminal device is not in the first local radio area; and wherein the second address is a phone number for contacting the first mobile terminal device when the first mobile terminal device is in the second radio area and is no longer in the first local radio area.

2. The method of claim 1, wherein the determined radio area of the first mobile terminal device is signaled or transmitted to the application of the network by a network specific terminal device protocol and wherein the parameter of the Register Request Message is an expanded contact parameter or an expanded parameter.

3. The method of claim 2, wherein the network-specific terminal device protocol is a session initiation protocol (SIP).

4. The method of claim 1, wherein the first local radio area is a radio cell of a wireless network or a mobile radio network and the network address of an allocated fixed-line network is allocated to the first local radio area for the first mobile terminal device.

5. The method of claim 1, wherein when the first mobile terminal device is within the first local radio area and the communication request is from a fixed line network, the communication request is forwarded to the mobile terminal device via a network address allocated to the first local radio area.

6. The method of claim 1, wherein the first mobile terminal device determines whether the first mobile terminal device is in the first local radio area or another radio area by determining an identifier of the radio area in which the first mobile terminal device is located and comparing that identifier to a stored identifier.

7. A method for transmitting information relating to communication links for a mobile terminal device assigned to a first local radio area of a network, the mobile terminal device having a first address for communications when in the first local radio area, the method comprising:
   the mobile terminal device determining that the mobile terminal device is located in a second radio area and is no longer in the first local radio area, the determination made by the mobile terminal device being based upon a comparison of a recognition signal to be received by the mobile terminal device when the mobile terminal device is in the first local radio area of the network with a recognition signal received when the mobile terminal device is located in the second radio area;
   signaling the determined second radio area by the mobile terminal device to an application on the network, the signaling comprising the mobile terminal device transmitting an indication that the mobile terminal device is no longer in the first radio area to the application via a network-specific terminal device protocol, wherein the signaling of the determined second radio area by the mobile terminal device is effected by the mobile terminal device sending a message to the application of the network, the message being one of:
   (i) a Register Request Message containing a parameter indicating that the mobile terminal device is located in the second radio area, the parameter comprising a second address of the mobile communication device, and
   (ii) a Register Request Message containing a parameter indicating that the mobile terminal device is not located in the first local radio area; and
   through the application, directing a communication request addressed to the mobile terminal device to the mobile terminal device for communications with the mobile terminal device by use of a second address when the mobile terminal device is in the second radio area wherein the second address is a phone number for contacting the mobile terminal device when the mobile terminal device is in the second radio area and is no longer in the first local radio area.

8. The method of claim 7, wherein the signaling of the determined second radio area occurs by a transmission path that is comprised of a data channel or a service data channel.

9. The method of claim 7, further comprising assigning a network address of an assigned fixed network to the mobile terminal device by the first local radio area as the first address, wherein the first local radio area is a member of the group consisting of a radio zone in a wireless network and a mobile wireless network.

10. The method of claim 7, comprising, in the mobile terminal device, assigning the recognition signal for the first local radio area to an application being run by the mobile terminal device, the application of the mobile terminal device identifying the recognition signal for the second radio area and performing the comparison of the recognition signal received by the mobile terminal device when the mobile terminal device is in the first local radio area of the network with the recognition signal received when the mobile terminal device is located in the second radio area, wherein the recognition signal received by the mobile terminal device when the mobile terminal device is in the first local radio area is represented by at least one recognition signal for one or more radio base stations included in the first local radio area.

11. The method of claim 7, wherein the network-specific terminal device protocol being a standardized Session Initiation Protocol and the mobile terminal device is a member of the group consisting of a telephone terminal device, a mobile multimedia terminal device, and a mobile terminal device in a fixed network.

12. The method of claim 7, wherein the second address is associated with the mobile terminal device when the mobile terminal device is in the second radio area.

13. The method of claim 12, further comprising the application routing a communication link between a calling terminal device and the mobile terminal device via the second address to establish a connection between the mobile terminal device and the calling terminal device.

14. The method of claim 13, wherein the application on the network is an application run on a server of the network.

15. The method of claim 12 further comprising routing a communication link between a calling terminal device and the mobile terminal device via the second address to establish a connection between the mobile terminal device and the calling terminal device.

16. The method of claim 7, wherein the parameter of the Register Request Message is an expanded contact parameter or an expanded parameter.

17. A communication request system comprising:
   a first application in a mobile terminal device for identifying the mobile terminal device's location in a first local radio area of a first network to which the mobile terminal device is assigned or a second radio area, the mobile terminal device having a first address for being reached when located in the first local radio area and a second address that is different than the first address for communications when in the second radio area, wherein the second address is a phone number for contacting the mobile terminal device when the mobile terminal device is in the second radio area and is no longer in the first local radio area of the first network;
   upon a determination that the mobile terminal device is in the second radio area based upon a comparison of a recognition signal to be received by the mobile terminal device when the mobile terminal device is in the first local radio area with a recognition signal received by the mobile terminal device when the mobile terminal device is in the second radio area, the mobile terminal device signaling the identified second radio area to a second application on the first network, the signaling comprising the mobile terminal transmitting an indication that the mobile terminal device is no longer in the first radio area to the second application via a network-specific terminal device protocol,
   wherein the signaling is effected by one of:
   (i) a Register Request Message containing a parameter indicating that the mobile terminal device is located in the second radio area, the parameter comprising the second address of the mobile communication device, and
   (ii) a Register Request Message containing a parameter indicating that the mobile terminal device is no longer located in the first local radio area.

18. The system of claim 17, wherein the parameter of the Register Request Message is an expanded contact parameter or an expanded parameter.

19. The system of claim 17, wherein the network-specific terminal device protocol is a standardized Session Initiation Protocol (SIP).

20. The system of claim 17, wherein the second application is run on a server of the first network.

* * * * *